(12) United States Patent
Oren

(10) Patent No.: US 9,475,661 B2
(45) Date of Patent: *Oct. 25, 2016

(54) METHODS OF STORING AND MOVING PROPPANT AT LOCATION ADJACENT RAIL LINE

(71) Applicant: Oren Technologies, LLC, Houston, TX (US)

(72) Inventor: John Oren, Houston, TX (US)

(73) Assignee: Oren Technologies, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,893

(22) Filed: May 2, 2016

(65) Prior Publication Data
US 2016/0244278 A1    Aug. 25, 2016

Related U.S. Application Data

(63) Continuation of application No. 14/851,005, filed on Sep. 11, 2015, now Pat. No. 9,358,916, which is a continuation of application No. 14/314,468, filed on Jun. 25, 2014, now Pat. No. 9,162,603, which is a
(Continued)

(51) Int. Cl.
*B60P 1/64* (2006.01)
*B65G 65/34* (2006.01)
(Continued)

(52) U.S. Cl.
CPC .............. *B65G 65/34* (2013.01); *B65D 88/022* (2013.01); *B65D 88/12* (2013.01); *B65D 88/54* (2013.01);
(Continued)

(58) Field of Classification Search
CPC ........ B60P 1/6418; B60P 3/00; B65G 57/09; B65G 57/20; B65G 65/30; B65G 65/23; B65G 65/32; B65G 65/42; B65G 67/04; B65G 67/24; B65D 88/54; B65D 88/56; B65D 88/70; B65D 90/008; B65D 90/34; B61B 1/005
USPC ....................................................... 414/802
See application file for complete search history.

(56) References Cited

U.S. PATENT DOCUMENTS

| 137,871 A | 4/1873 | Worsley |
| 150,894 A | 5/1874 | Safely |

(Continued)

FOREIGN PATENT DOCUMENTS

| CA | 2023138 | 2/1992 |
| CA | 2791088 | 3/2013 |

(Continued)

OTHER PUBLICATIONS

International Search Report for related International Application No. PCT/US2012/066639, Feb. 25, 2013.
(Continued)

*Primary Examiner* — Michael McCullough
*Assistant Examiner* — Lynn Schwenning
(74) *Attorney, Agent, or Firm* — Hogan Lovells US LLP

(57) ABSTRACT

A method of delivering proppant to a well site has the steps of transporting a load of proppant in a vessel to a desired location, moving the load of proppant from the vessel into a container so as to create a proppant-loaded container, unloading the proppant-loaded container into a pneumatic bulk trailer, and transporting the unloaded proppant in the pneumatic bulk trailer to well site. The container is placed onto a bed of a truck and moved in proximity to the vessel. The proppant-loaded container is placed onto a tilting mechanism and then tilted so that the proppant is discharged through a flow gate of a container into a hopper. The proppant in the hopper can then be conveyed to the pneumatic bulk trailer.

20 Claims, 2 Drawing Sheets

Related U.S. Application Data continuation of application No. 14/310,648, filed on Jun. 20, 2014, now Pat. No. 9,248,772, which is a continuation of application No. PCT/US2013/032819, filed on Mar. 18, 2013, which is a continuation of application No. 13/427,140, filed on Mar. 22, 2012, now Pat. No. 8,622,251, which is a continuation-in-part of application No. 13/332,937, filed on Dec. 21, 2011, now Pat. No. 8,827,118.

(51) Int. Cl.
| | | |
|---|---|---|
| B65G 57/02 | (2006.01) | |
| B65G 65/32 | (2006.01) | |
| B65G 67/24 | (2006.01) | |
| B65G 67/02 | (2006.01) | |
| B65D 88/02 | (2006.01) | |
| B65D 88/12 | (2006.01) | |
| B65D 90/54 | (2006.01) | |
| B65D 88/54 | (2006.01) | |

(52) U.S. Cl.
CPC .............. *B65D 90/54* (2013.01); *B65G 57/02* (2013.01); *B65G 65/32* (2013.01); *B65G 67/02* (2013.01); *B65G 67/24* (2013.01); *B65G 2203/0216* (2013.01)

(56) References Cited

U.S. PATENT DOCUMENTS

| | | | |
|---|---|---|---|
| 384,443 | A | 6/1888 | Hoover |
| 448,238 | A | 3/1891 | Johnson |
| 711,632 | A | 10/1902 | Johnson |
| 917,649 | A | 4/1909 | Otto |
| 1,143,641 | A | 6/1915 | McGregor |
| 1,331,883 | A | 2/1920 | Stuart |
| 1,344,768 | A | 6/1920 | Messiter |
| 1,434,488 | A | 11/1922 | Forsythe et al. |
| 1,520,560 | A | 12/1923 | Burno |
| 1,506,936 | A | 9/1924 | Lea |
| 1,526,527 | A | 2/1925 | Butler |
| 1,573,664 | A | 2/1926 | Wetherill |
| 1,850,000 | A | 3/1932 | Fernand |
| 1,973,312 | A | 9/1934 | Hardinge |
| 2,233,005 | A | 2/1941 | Garlinghouse |
| 2,293,160 | A | 8/1942 | Miller et al. |
| 2,368,672 | A | 2/1945 | McNamara |
| 2,423,879 | A | 7/1947 | De Frees |
| 2,564,020 | A | 8/1951 | Mengel |
| 2,616,758 | A | 11/1952 | Meyers |
| 2,622,771 | A | 12/1952 | Tulou |
| 2,652,174 | A | 9/1953 | Shea et al. |
| 2,792,262 | A | 4/1955 | Hathorn |
| 2,865,521 | A | 12/1958 | Fisher et al. |
| 2,894,666 | A | 7/1959 | Campbell, Jr. |
| 3,049,248 | A | 8/1962 | Heltzel et al. |
| 3,064,832 | A | 11/1962 | Heltzel |
| 3,083,879 | A | 4/1963 | Coleman |
| 3,090,527 | A | 5/1963 | Rensch |
| 3,163,127 | A | 12/1964 | Gutridge et al. |
| 3,199,585 | A | 8/1965 | Cronberger |
| 3,248,026 | A | 4/1966 | Kemp |
| 3,270,921 | A | 9/1966 | Nadolske et al. |
| 3,281,006 | A | 10/1966 | Wei |
| 3,294,306 | A | 12/1966 | Areddy |
| 3,318,473 | A | 5/1967 | Jones et al. |
| 3,353,599 | A | 11/1967 | Swift |
| 3,354,918 | A | 11/1967 | Coleman |
| 3,378,152 | A | 4/1968 | Warner |
| 3,387,570 | A | 6/1968 | Pulcrano et al. |
| 3,397,654 | A | 8/1968 | Snyder |
| 3,407,971 | A | 10/1968 | Oehler |
| 3,455,474 | A | 7/1969 | Truncali |
| 3,528,570 | A | 9/1970 | Pase |
| 3,561,633 | A | 2/1971 | Morrison et al. |
| 3,587,834 | A | 6/1971 | Dugge |
| 3,601,244 | A | 8/1971 | Ort et al. |
| 3,602,400 | A | 8/1971 | Cooke |
| 3,653,521 | A | 4/1972 | Bridge |
| 3,661,293 | A | 5/1972 | Gerhard et al. |
| 3,721,199 | A | 3/1973 | Hassenauer |
| 3,729,121 | A | 4/1973 | Cannon |
| 3,738,511 | A | 6/1973 | Lemon et al. |
| 3,785,534 | A | 1/1974 | Smith |
| 3,800,712 | A | 4/1974 | Krug, Jr. |
| 3,817,261 | A | 6/1974 | Rogge |
| 3,820,762 | A | 6/1974 | Bostrom et al. |
| 3,861,716 | A | 1/1975 | Baxter et al. |
| 3,883,005 | A | 5/1975 | Stevens |
| 3,986,708 | A | 10/1976 | Heltzel et al. |
| 4,004,700 | A | 1/1977 | Empey |
| 4,063,656 | A | 12/1977 | Lambert |
| 4,138,163 | A | 2/1979 | Calvert et al. |
| 4,178,117 | A | 12/1979 | Brugler |
| 4,204,773 | A | 5/1980 | Bates |
| 4,210,273 | A | 7/1980 | Hegele |
| 4,210,963 | A | 7/1980 | Ricciardi et al. |
| RE30,358 | E | 8/1980 | Sensibar |
| 4,222,498 | A | 9/1980 | Brock |
| 4,232,884 | A | 11/1980 | DeWitt |
| 4,239,424 | A | 12/1980 | Pavolka |
| 4,247,228 | A | 1/1981 | Gray et al. |
| 4,265,266 | A | 5/1981 | Kierbow et al. |
| 4,282,988 | A | 8/1981 | Hulbert, Jr. |
| 4,350,241 | A | 9/1982 | Wenzel |
| 4,359,176 | A | 11/1982 | Johnson |
| 4,363,396 | A | 12/1982 | Wolf et al. |
| 4,397,406 | A | 8/1983 | Croley |
| 4,398,653 | A | 8/1983 | Daloisio |
| 4,402,392 | A | 9/1983 | Fabian et al. |
| 4,407,202 | A | 10/1983 | McCormick |
| 4,408,886 | A | 10/1983 | Sampson et al. |
| 4,428,504 | A | 1/1984 | Bassett et al. |
| 4,449,861 | A | 5/1984 | Saito et al. |
| 4,474,204 | A | 10/1984 | West |
| 4,478,155 | A | 10/1984 | Cena et al. |
| 4,532,098 | A | 7/1985 | Campbell |
| 4,608,931 | A | 9/1986 | Ruhmann et al. |
| 4,626,155 | A | 12/1986 | Hlinsky et al. |
| 4,701,095 | A | 10/1987 | Berryman et al. |
| 4,715,754 | A | 12/1987 | Scully |
| 4,738,774 | A | 4/1988 | Patrick |
| 4,741,273 | A | 5/1988 | Sherwood |
| 4,801,389 | A | 1/1989 | Brannon et al. |
| 4,819,830 | A | 4/1989 | Schultz |
| 4,848,605 | A | 7/1989 | Wise |
| 4,882,784 | A | 11/1989 | Tump |
| 4,901,649 | A | 2/1990 | Fehrenbach et al. |
| 4,909,378 | A | 3/1990 | Webb |
| 4,909,556 | A | 3/1990 | Koskinen |
| 4,917,019 | A | 4/1990 | Hesch et al. |
| 4,919,583 | A | 4/1990 | Speakman, Jr. |
| 4,946,068 | A | 8/1990 | Erickson et al. |
| 4,947,760 | A | 8/1990 | Dawson et al. |
| 4,975,205 | A | 12/1990 | Sloan |
| 4,995,522 | A | 2/1991 | Barr |
| 5,004,400 | A | 4/1991 | Handke |
| 5,042,538 | A | 8/1991 | Wiese |
| 5,069,352 | A | 12/1991 | Harbolt et al. |
| 5,102,286 | A | 4/1992 | Fenton |
| 5,105,858 | A | 4/1992 | Levinson |
| 5,131,524 | A | 7/1992 | Uehara |
| 5,199,826 | A | 4/1993 | Lawrence |
| 5,201,546 | A | 4/1993 | Lindsay |
| 5,224,635 | A | 7/1993 | Wise |
| 5,253,776 | A | 10/1993 | Decroix et al. |
| 5,286,158 | A | 2/1994 | Zimmerman |
| 5,290,139 | A | 3/1994 | Hedrick |
| 5,320,046 | A | 6/1994 | Hesch |
| 5,339,996 | A | 8/1994 | Dubbert |
| 5,373,792 | A | 12/1994 | Pileggi et al. |
| 5,402,915 | A | 4/1995 | Hogan |
| 5,413,154 | A | 5/1995 | Hurst, Jr. et al. |

(56) References Cited

U.S. PATENT DOCUMENTS

| | | |
|---|---|---|
| 5,429,259 A | 7/1995 | Robin |
| 5,441,321 A | 8/1995 | Karpisek |
| 5,445,289 A | 8/1995 | Owen |
| 5,470,175 A | 11/1995 | Jensen et al. |
| 5,538,286 A | 7/1996 | Hoff |
| 5,564,599 A | 10/1996 | Barber et al. |
| 5,602,761 A | 2/1997 | Spoerre et al. |
| 5,613,446 A | 3/1997 | DiLuigi et al. |
| RE35,580 E | 8/1997 | Heider et al. |
| 5,687,881 A | 11/1997 | Rouse et al. |
| 5,690,466 A | 11/1997 | Gaddis et al. |
| 5,706,614 A | 1/1998 | Wiley et al. |
| 5,761,854 A | 6/1998 | Johnson et al. |
| 5,762,222 A | 6/1998 | Liu |
| 5,782,524 A | 7/1998 | Heider et al. |
| 5,785,421 A | 7/1998 | Milek |
| 5,806,863 A | 9/1998 | Heger et al. |
| 5,836,480 A | 11/1998 | Epp et al. |
| 5,876,172 A | 3/1999 | Di Rosa |
| 5,911,337 A | 6/1999 | Bedeker |
| 5,927,558 A | 7/1999 | Bruce |
| 5,971,219 A | 10/1999 | Karpisek |
| 6,002,063 A | 12/1999 | Bilak et al. |
| 6,069,118 A | 5/2000 | Hinkel et al. |
| 6,077,068 A | 6/2000 | Okumura |
| 6,109,486 A | 8/2000 | Lee |
| 6,120,233 A | 9/2000 | Adam |
| 6,155,175 A | 12/2000 | Rude et al. |
| 6,190,107 B1 | 2/2001 | Lanigan et al. |
| 6,192,985 B1 | 2/2001 | Hinkel et al. |
| 6,205,938 B1 | 3/2001 | Foley et al. |
| 6,247,594 B1 | 6/2001 | Garton |
| 6,283,212 B1 | 9/2001 | Hinkel et al. |
| 6,306,800 B1 | 10/2001 | Samuel et al. |
| 6,328,156 B1 | 12/2001 | Otsman |
| 6,328,183 B1 | 12/2001 | Coleman |
| 6,364,584 B1 | 4/2002 | Taylor |
| 6,401,983 B1 | 6/2002 | McDonald et al. |
| 6,415,909 B1 | 7/2002 | Mitchell et al. |
| 6,457,291 B2 | 10/2002 | Wick |
| 6,508,615 B2 | 1/2003 | Taylor |
| 6,537,002 B2 | 3/2003 | Gloystein |
| 6,575,614 B2 | 6/2003 | Tosco et al. |
| 6,660,693 B2 | 12/2003 | Miller et al. |
| 6,675,073 B2 | 1/2004 | Kieman et al. |
| 6,720,290 B2 | 4/2004 | England et al. |
| 6,772,912 B1 | 8/2004 | Schall et al. |
| 6,776,235 B1 | 8/2004 | England |
| 6,783,032 B2 | 8/2004 | Fons |
| 6,811,048 B2 | 11/2004 | Lau |
| 6,828,280 B2 | 12/2004 | England et al. |
| 6,835,041 B1 | 12/2004 | Albert |
| 6,882,960 B2 | 4/2005 | Miller |
| 6,902,061 B1 | 6/2005 | Elstone |
| 6,915,854 B2 | 7/2005 | England et al. |
| 6,953,119 B1 | 10/2005 | Wening |
| 6,955,127 B2 | 10/2005 | Taylor |
| 6,968,946 B2 | 11/2005 | Shuert |
| 7,084,095 B2 | 8/2006 | Lee et al. |
| 7,104,425 B2 | 9/2006 | Le Roy |
| 7,140,516 B2 | 11/2006 | Bothor |
| 7,214,028 B2 | 5/2007 | Boasso |
| 7,240,681 B2 | 7/2007 | Saik |
| 7,252,309 B2 | 8/2007 | Eng Soon |
| 7,284,579 B2 | 10/2007 | Elgan et al. |
| 7,316,333 B2 | 1/2008 | Wegner |
| 7,475,796 B2 | 1/2009 | Garton |
| 7,513,280 B2 | 4/2009 | Brashears et al. |
| 7,753,637 B2 | 7/2010 | Benedict et al. |
| 7,798,558 B2 | 9/2010 | Messier |
| 7,802,958 B2 | 9/2010 | Garcia et al. |
| 7,837,427 B2 | 11/2010 | Beckel et al. |
| 7,921,783 B2 | 4/2011 | Forbes et al. |
| 7,967,161 B2 | 6/2011 | Townsend |
| 8,083,083 B1 | 12/2011 | Mohns |
| 8,201,520 B2 | 6/2012 | Meritt |
| 8,313,278 B2 | 11/2012 | Simmons et al. |
| D688,351 S | 8/2013 | Oren |
| 8,505,780 B2 | 8/2013 | Oren |
| 8,562,022 B2 | 10/2013 | Nadeau et al. |
| 8,585,341 B1 | 11/2013 | Oren |
| 8,616,370 B2 | 12/2013 | Allegretti |
| 8,622,251 B2 | 1/2014 | Oren |
| 8,668,430 B2 | 3/2014 | Oren |
| D703,582 S | 4/2014 | Oren |
| 8,827,118 B2 | 9/2014 | Oren |
| 8,887,914 B2 | 11/2014 | Allegretti |
| 2001/0022308 A1 | 9/2001 | Epp et al. |
| 2001/0045338 A1 | 11/2001 | Ransil et al. |
| 2002/0134550 A1 | 9/2002 | Leeson et al. |
| 2002/0139643 A1 | 10/2002 | Peltier et al. |
| 2003/0111470 A1 | 6/2003 | Fouillet et al. |
| 2003/0156929 A1 | 8/2003 | Russell |
| 2004/0065699 A1 | 4/2004 | Schoer et al. |
| 2004/0074922 A1 | 4/2004 | Bother et al. |
| 2004/0084874 A1 | 5/2004 | McDougall et al. |
| 2004/0206646 A1 | 10/2004 | Goh |
| 2004/0245284 A1 | 12/2004 | Mehus et al. |
| 2005/0158158 A1 | 7/2005 | Porta |
| 2005/0201851 A1 | 9/2005 | Jonkka |
| 2006/0180062 A1 | 8/2006 | Furrer et al. |
| 2006/0180232 A1 | 8/2006 | Glewwe et al. |
| 2006/0239806 A1 | 10/2006 | Yelton |
| 2006/0267377 A1 | 11/2006 | Lusk et al. |
| 2006/0277783 A1 | 12/2006 | Garton |
| 2007/0096537 A1 | 5/2007 | Hicks |
| 2007/0125543 A1 | 6/2007 | McNeel et al. |
| 2008/0008562 A1 | 1/2008 | Beckel et al. |
| 2008/0029546 A1 | 2/2008 | Shuld |
| 2008/0029553 A1 | 2/2008 | Culleton |
| 2008/0179054 A1 | 7/2008 | McGough et al. |
| 2008/0179324 A1 | 7/2008 | McGough et al. |
| 2008/0213073 A1 | 9/2008 | Benedict et al. |
| 2008/0226434 A1 | 9/2008 | Smith et al. |
| 2008/0264641 A1 | 10/2008 | Slabaugh et al. |
| 2009/0038242 A1 | 2/2009 | Cope |
| 2009/0078410 A1 | 3/2009 | Krenek et al. |
| 2009/0278326 A1 | 11/2009 | Rowland et al. |
| 2010/0021258 A1 | 1/2010 | Kim |
| 2010/0038143 A1 | 2/2010 | Burnett et al. |
| 2010/0040446 A1 | 2/2010 | Renyer |
| 2010/0065466 A1 | 3/2010 | Perkins |
| 2010/0108711 A1 | 5/2010 | Wietgrefe |
| 2011/0011893 A1 | 1/2011 | Cerny |
| 2011/0017693 A1 | 1/2011 | Thomas |
| 2011/0101040 A1 | 5/2011 | Weissbrod |
| 2011/0109073 A1 | 5/2011 | Williams |
| 2011/0160104 A1 | 6/2011 | Wu et al. |
| 2011/0222983 A1 | 9/2011 | Dugic et al. |
| 2012/0219391 A1 | 8/2012 | Teichrob et al. |
| 2013/0004272 A1 | 1/2013 | Mintz |
| 2013/0022441 A1 | 1/2013 | Uhryn et al. |
| 2013/0206415 A1 | 8/2013 | Sheesley |
| 2013/0209204 A1 | 8/2013 | Sheesley |
| 2013/0233545 A1 | 9/2013 | Mahoney |
| 2013/0309052 A1 | 11/2013 | Luharuka |
| 2013/0323005 A1 | 12/2013 | Rexius et al. |
| 2014/0020765 A1 | 1/2014 | Oren |
| 2014/0020892 A1 | 1/2014 | Oren |
| 2014/0023465 A1 | 1/2014 | Oren et al. |
| 2014/0083554 A1 | 3/2014 | Harris |
| 2014/0097182 A1 | 4/2014 | Sheesley |
| 2014/0166647 A1 | 6/2014 | Sheesley |
| 2014/0203046 A1 | 7/2014 | Allegretti |
| 2014/0234059 A1 | 8/2014 | Thomeer |
| 2014/0305769 A1 | 10/2014 | Eiden et al. |
| 2014/0321950 A1 | 10/2014 | Krenek et al. |
| 2015/0069052 A1 | 3/2015 | Allegretti et al. |
| 2015/0086307 A1 | 3/2015 | Stefan |

FOREIGN PATENT DOCUMENTS

| | | |
|---|---|---|
| CN | 201881469 | 6/2011 |
| DE | 3108121 | 9/1982 |

(56) References Cited

FOREIGN PATENT DOCUMENTS

| | | |
|---|---|---|
| DE | 3342281 | 6/1985 |
| EP | 0019967 | 12/1980 |
| EP | 0997607 | 5/2000 |
| EP | 1775190 | 4/2007 |
| EP | 2062832 | 5/2009 |
| GB | 1296736 | 11/1972 |
| GB | 2374864 | 10/2002 |
| JP | S4871029 | 9/1973 |
| JP | S4876041 | 9/1973 |
| JP | S58161888 | 10/1983 |
| JP | 410087046 | 4/1998 |
| JP | 10264882 | 10/1998 |
| MX | 2012011046 | 5/2013 |
| WO | 9008082 | 7/1990 |
| WO | 9202437 | 2/1992 |
| WO | 1993006031 | 4/1993 |
| WO | 2006039757 | 4/2006 |
| WO | 2007005054 | 1/2007 |
| WO | 2010026235 | 3/2010 |
| WO | 2011099358 | 8/2011 |
| WO | 2012021447 | 2/2012 |
| WO | 2012058059 | 5/2012 |

OTHER PUBLICATIONS

International Search Report for related International Application No. PCT/US2013/035442, Jun. 23, 20113.
International Search Report for related International Application No. PCT/US2013/032819, May 23, 2013.
International Search Report for related International Application No. PCT/US2013/049028, Mar. 4, 2014.
International Preliminary Report on Patentability for PCT/US2012/066639, Feb. 26, 2013.
International Preliminary Report on Patentability for PCT/US2013/032819, Sep. 23, 2014.
International Search Report for PCT/US2015/012990, dated May 6, 2015. (15 pages).
FS-35 Desert Frac-Sanders. NOV (National Oilwell Varco). Mar. 19, 2012. (https://web.archive.org/web/20120319070423/http://www.nov.com/Well_Service_and_Completion/Frac_Sand_Handling_Equipment/Frac_Sanders/FS-35.aspx).
File History for U.S. Appl. No. 61/538,616, Robert A. Harris, Sep. 23, 2011. (21 pages).
International Search Report for PCT/US2015/024810, Jul. 8, 2015. (13 pages).
European Search Report for Application No. 15167039.5, Sep. 8, 2015. (7 pages).
SandBox Logistics, "Mine to Wellhead Logistics," Houston, TX, May 2013.
SandBox Logistics, screenshots from video made in Apr. 2013 and publicly shown in May, 2013, Arnegard, North Dakota.
International Search Report for PCT/US15/35635, Oct. 30, 2015. (12 pages).
PCT International Search Report for PCT/US15/49074, Dec. 17, 2015. (11 pages).
PCT International Search Report for PCT/US15/57601, May 6, 2016. (11 pages).
Grit Energy Solutions, LLC, Fidelity, Screenshots from video dated May 16, 2014.
Grit Energy Solutions, LLC, Gate, Screenshots from video dated Dec. 6, 2013, https://www.youtube.com/user/gritstack.
Grit Energy Solutions, LLC, Screen, Screenshots from video dated Dec. 6, 2013, https://www.youtube.com/user/gritstack.
Grit Energy Solutions, LLC, The Grit Stack System—Live Frac, Screenshots from video dated Jun. 15, 2015, https://www.youtube.com/user/gritstack.
Grit Energy Solutions, LLC, The Grit Stack System, Screenshots from video dated Feb. 7, 2014, https://www.youtube.com/user/gritstack.
SandBox Logistics, LLC, screenshots from video dated Sep. 19, 2013.
SandBox Logistics, LLC, screenshots from video dated Aug. 22, 2014.
SandBox Logistics, LLC, screenshots from video dated Oct. 11, 2013.
SandBox Logistics, LLC, screenshots from video dated Apr. 10, 2013.

METHODS OF STORING AND MOVING PROPPANT AT LOCATION ADJACENT RAIL LINE

RELATED APPLICATIONS

This application claims the benefit of, and is a continuation of U.S. patent application Ser. No. 14/851,005, filed Sep. 11, 2015, titled "Methods of Storing and Moving Proppant at Location Adjacent Rail Line," which is a continuation of U.S. patent application Ser. No. 14/314,468, filed Jun. 25, 2014, titled "Methods of Storing and Moving Proppant at Location Adjacent Rail Line," now U.S. Pat. No. 9,162,603, issued Oct. 20, 2015, which is a continuation of U.S. patent application Ser. No. 14/310,648, filed Jun. 20, 2014, titled "Method of Delivering, Transporting, and Storing Proppant for Delivery and Use at a Well Site," now U.S. Pat. No. 9,248,772, issued Feb. 2, 2016, which is a continuation of PCT Application No. PCT/US13/32819, filed on Mar. 18, 2013, titled "System of Delivering and Storing Proppant for Use at a Well Site and Container for Such Proppant," which claims the benefit of U.S. patent application Ser. No. 13/427,140, filed on Mar. 22, 2012, titled "System of Delivering and Storing Proppant for Use at a Well Site and Container for Such Proppant," now U.S. Pat. No. 8,622,251, issued on Jan. 7, 2014, which is a continuation-in-part of U.S. patent application Ser. No. 13/332,937 filed on Dec. 21, 2011, titled "Proppant Storage Vessel and Assembly Thereof," now U.S. Pat. No. 8,827,118, issued on Sep. 9, 2014, all of which are incorporated herein by reference in their entireties.

BACKGROUND

1. Field of the Invention

The present invention relates to proppant storage containers. More particularly, the present invention relates to systems and methods for the delivery of proppant to a well site. More particularly, the present invention relates to containers as part of a system of storing proppant prior to delivery to a well site.

2. Description of Related Art

Hydraulic fracturing is the propagation of fractions in a rock layer caused by the presence of pressurized fluid. Hydraulic fractures may form naturally, in the case of veins or dikes, or may be man-made in order to release petroleum, natural gas, coal seam gas, or other substances for extraction. Fracturing is done from a wellbore drilled into reservoir rock formations. The energy from the injection of a highly-pressurized fracturing fluid creates new channels in the rock which can increase the extraction rates and ultimate recovery of fossil fuels. The fracture width is typically maintained after the injection by introducing a proppant into the injected fluid. Proppant is a material, such as grains of sand, ceramic, or other particulates, that prevent the fractures from closing when the injection is stopped.

With the rise of hydraulic fracturing over the past decade, there is a steep climb in proppant demand. Global supplies are currently tight. The number of proppant suppliers worldwide has increased since 2000 from a handful to well over fifty sand, ceramic proppant and resin-coat producers.

By the far the dominant proppant is silica sand, made up of ancient weathered quartz, the most common mineral in the Earth's continental crust. Unlike common sand, which often feels gritty when rubbed between the fingers, sand used as a proppant tends to roll to the touch as a result of its round, spherical shape and tightly-graded particle distribution. Sand quality is a function of both deposit and processing. Grain size is critical, as any given proppant must reliably fall within certain mesh ranges, subject to downhole conditions and completion design. Generally, coarser proppant allows the higher flow capacity due to the larger pore spaces between grains. However, it may break down or crush more readily under stress due to the relatively fewer grain-to-grain contact points to bear the stress often incurred in deep oil- and gas-bearing formations.

Typically, in any hydraulic fracturing operation, a large amount of such proppant is required. Typically, it has been difficult to effectively store the proppant at the fracturing sites. Additionally, it has been found to be rather difficult to effectively transport the proppant to the desired location. Often, proppant is hauled to the desired locations on the back of trucks and is dumped onsite. Under such circumstances, the proppant is often exposed to adverse weather conditions. This will effectively degrade the quality of the proppant during its storage. Additionally, the maintenance of proppant in containers at the hydraulic fracturing site requires a large capital investment in storage facilities. Typically, the unloading of such storage facilities is carried out on a facility-by-facility basis. As such, there is a need to be able to effectively transport the proppant to and store the proppant in a desired location adjacent to the hydraulic fracturing location.

Present methods of storing proppant for use at the well site has involved a significant investment in structural facilities. In particular, silos have been built in order to store proppant for use in the fracturing operation. Often, the silos can have a cost of several million dollars. Whenever such silos are used, there is a possibility of contamination of the proppant that is contained within the silo. Large storage facilities often mix various types and qualities of proppant. As such, lower quality proppant may be mixed with higher quality proppant so as to create an undesirable contaminated combination.

The availability of high quality proppant is always of a major concern during such fracturing operations. If the proppant is not available at the well site, then the fracturing operation can stall until such time that proppant is available. In other circumstances, the operators of the fracturing operation may be forced to use lower quality proppant in order to continue the operation. As such, there is a need to be able to have high quality proppant available at all times during the fracturing operation. It is also advantageous to provide a system which avoids the mixture of different types of proppant and to avoid the contamination of the proppant supply.

Under certain circumstances, railcars are used to deliver proppant to the fracturing location. The proppant is unloaded from the railcars into pneumatic bulk trailers. The pneumatic bulk trailers can then deliver the proppant to the well site. Often, the bulk materials train will have to remain on-site during the time the proppant remains in the bulk material train. As such, the train is not able to be used for other purposes. This adds additional cost to the fracturing operation. Ultimately, after the train is completely unloaded, a new bulk material train must be transported to the desired location and then serve as a storage facility. As such, a need is developed so as to quickly remove all of the proppant from the bulk material train and to store such proppant until such time as the proppant is needed.

In the past, various patents have issued relating to storage and transport facilities. For example, U.S. Patent Publication No. 2008/0179054, published on Jul. 31, 2008 to McGough et al., shows a bulk material storage and transportation system. In particular, the storage system is mounted on the trailer of a truck. The storage system includes walls that define an interior volume suitable for receiving the aggregate material therein. There are hoppers provided at the bottom of the container. These hoppers have inclined walls. The hoppers can extend so as to allow the material from the inside of the container to be properly conveyed to a location exterior of the container. Actuators are used so as to expand and collapse the container.

U.S. Pat. No. 7,240,681, issued on Jul. 10, 2007 to L. Saik, describes a trailer-mounted mobile apparatus for dewatering and recovering formation sand. The trailer is mounted to a truck-towable trailer so as to receive sand therein. The container has a pair of sloping end walls. The back end of the container is suitably openable so as to allow the sand to be removed therefrom. A pneumatic or hydraulic ram is provided on the forward part of the container so as to allow the container to be lifted angularly upwardly so as to allow sand to be discharged through the gate at the rear of the container.

U.S. Pat. No. 4,247,228, issued on Jan. 27, 1981 to Gray et al., describes a dump truck or trailer with a pneumatic conveyor. The container is mounted to a frame on wheels. A hydraulic ram tilts the container for dumping through a rear outlet. A pneumatic conveyor is carried by the frame with an intake at the rear of the container. A gate allows the solids to be dumped conventionally by gravity or to be blown to a storage facility by the pneumatic container. The container has a top hatch formed therein so as to allow the solids to be introduced into the interior of the container.

U.S. Pat. No. 2,865,521, issued on Dec. 23, 1958 to Fisher et al., shows a bulk material truck that has an interior volume suitable for the receipt of bulk material therein. A pneumatic conveyer is utilized so as to allow the removal of such material from the bottom of the container. A pair of sloping walls are provided on opposite sides of the container so as to allow the bulk material within the container to be passed toward the bottom of the container. A top hatch is provided on the top of the conveyer. The pneumatic conveyer is connected to the bottom of the container.

U.S. Pat. No. 4,995,522, issued on Feb. 26, 1991, to F. M. Barr, describes a bottom dumping bulk container apparatus for a bulk granulated material. The shipping container has a lower wall with a discharge opening. Doors are provided for the opening and closing of the discharge opening. The doors are actuated by an actuating structure which is mounted for vertical movement relative to the container. The actuating structure has upper portions which serve as conventional lifting connectors or receptacles at corners of the container. These cooperate with conventional hooks so that raising the actuating structure opens the door and lowering the actuating structure closes the door. This permits granulated material within the container to be dumped into a lower container or conveyance without requiring specialized lifting or opening equipment.

U.S. Pat. No. 6,401,983, issued on Jun. 11, 2002 to McDonald et al., provides a bulk cargo container for storing and transporting solid and liquid bulk materials. The bulk cargo container includes a vessel suitable for containing the bulk material and a supporting frame assembly having a generally horizontally-disposed support member attachment. The container portion is formed into at least one hopper having a discharge opening therein suitable for discharging bulk material contained within the vessel.

U.S. Pat. No. 4,138,163, issued on Feb. 6, 1979 to Calvert et al., discloses a bulk material container for the handling of flowable particulate materials. This container has a closed, generally rectangular parallelpiped structure with side walls, end walls and a roof. Conduits permit the introduction and withdrawal of particulate material to and from the container body. The lower base portion supports a vertical flexure panel at each corner thereof. The vertical flexure panel supports opposed pairs of longitudinal and transverse flexure panels between the tops thereof.

U.S. Pat. No. 4,909,556, issued on Mar. 20, 1990 to T. Koskinen, provides a transport container for the transport of bulk material. This transport container has a filling-hole in the upper part and an emptying device in the rear. For the loading and unloading, a side section is provided that can be opened. An emptying device, in the nature of a pneumatic pressure discharger, allows the material to freely flow from the containers through a check valve.

U.S. Pat. No. 7,967,161, issued on Jun. 28, 2011 to A. M. Townsend, provides a shipping container liner system for the shipping of bulk flowable materials. The system has a specially-adapted shipping container liner that is self-supporting without the need for rear-mounted rigid supportive bars to retain the liner within the shipping container during filling and discharge. The system has an arrangement of interior support baffles operating in conjunction with a plurality of exterior anchor straps adapted to distribute the cargo load throughout the length of the container.

U.S. Pat. No. 5,690,466, issued on Nov. 25, 1997 to Gaddis et al., shows slope plate for a particulate material truck box. The slope plate assembly includes a plurality of slope plate sections pivotally connected to the opposite side walls of the truck box so as to be movable between a raised inoperative position and a lowered operative position. In the lowered position, particulate material flows by gravity along the slope plate sections for discharge into an auger assembly residing below the floor of the truck box. In the raised position, bulk material or other cargo can be loaded into the truck box.

It is the object of the present invention to provide a system for the storage and transport of proppant that is mobile, scalable and flexible.

Another object to the present invention to provide a system for the storage and transport of proppant that can be located in proximity to the rail spur.

Another object of the present invention to provide a system for the transport and storage of proppant that can be rapidly implemented.

Another object of the present invention to provide a system for the storage and transport of proppant that occupies a small footprint.

The further object of the present invention to provide a system for the storage and transport of proppant that assures a continuous inventory of proppant to the fracturing operation.

Still another object of the present invention is to provide a system for the storage and transport of proppant that is movable and rechargeable at the drill site.

The further object of the present invention is to provide a system for the storage and transport of proppant that enhances the productivity of the proppant supplier.

The further object of the present invention to provide a system for the storage and transport of proppant that reduces driver fatigue.

Another object of the present invention to provide a system for the storage and transport of proppant that reduces liabilities.

The further object of the present invention to provide a system for the storage and transport of proppant that improves safety.

Further object of the present invention to provide a system for the storage and transport of proppant that is compliant with Department of Transportation regulations.

Still another object of the present invention to provide a system for the storage and transport of proppant which improves the profits for the proppant supplier.

These and other objects and advantages of the present invention will become apparent from a reading of the attached specification and appended claims.

SUMMARY

The present invention is an apparatus for proppant storage. This apparatus comprises a container having a bottom wall, a top wall, a pair of side walls, and a pair of end walls. The pair of side walls extend between the pair of end walls and between the bottom wall and the top wall. The container has an interior volume. A hatch is positioned on the top wall. This hatch is openable so as to allow the proppant to be introduced into the interior volume of the container. A flow gate is positioned on one of the end walls. The flow gate is openable so as to allow the proppant to flow outwardly of the interior volume of the container.

In the apparatus of the present invention, at least one of the end walls is recessed inwardly of the end of the pair of side walls and inwardly at the bottom wall and inwardly at the top wall. This end wall has a generally convex shape. A proppant inlet is affixed to the end wall. The proppant inlet communicates with the interior volume of the container. The proppant inlet is suitable for allowing proppant to be introduced into the interior volume of the container. A vent also opens to the interior volume. This vent is formed at an upper portion of one of the pair of end walls.

A longitudinal member is positioned in the interior volume of the container. The longitudinal member has one end affixed to one of the pair of end walls and an opposite end affixed to the other of the pair of end walls. A first cross member is positioned in the interior volume of the container. The first cross member has one end affixed to one of the pair of side walls and an opposite end affixed to the other of the pair of side walls. A second cross member is positioned in the interior volume of the container and in spaced relationship to the first cross member. The second cross member has one end affixed to one of the pair of side walls and an opposite end affixed to the other of the pair of side walls. A flow gate is positioned on one of the end walls generally adjacent to the bottom wall. This flow gate is slidable between an open position and a closed position.

The present invention is also a method of delivering proppant that comprises the steps of: (1) transporting a load of proppant in a vessel to a desired location; (2) moving the load of proppant from the vessel into a container so as to create a proppant-loaded container; (3) unloading the proppant-loaded container into a pneumatic bulk trailer; and (4) transporting the unloaded proppant in the pneumatic bulk trailer to a well site.

The vessel is a hopper of a bulk material train. The step of transporting includes loading the hopper with proppant in a remote location and then transporting the loaded proppant in the hopper of the bulk material train to the desired location. The step of moving includes conveying the proppant from the hopper of the bulk material train into a hatch formed at the top of the container.

The container can be placed onto the bed of a truck. The truck is moved so that the container is adjacent to the vessel. As such, the empty container is available so that the proppant can be conveyed from the hopper of the bulk material train into the interior volume of the container.

The step of unloading includes placing the proppant-loaded container onto a tilting mechanism, tilting the placed proppant-loaded container to an angle such that an end wall of the container faced downwardly at an angle, and discharging the proppant from the tilted container to a flow gate of the container. The proppant flows through the container of the flow gate into a hopper. This flowed proppant is conveyed from the hopper into the pneumatic bulk trailer. Air is injected into the container as the proppant flows through the flow gate. A plurality of the proppant-loaded containers can be stacked at the desired location prior to the step of unloading.

The present invention is also a method of delivering and storing proppant for use at the well site. This method includes the steps of: (1) transporting the load of proppant in a vessel to a desired location; (2) moving the load of proppant from the vessel into a plurality of containers so as to create a plurality of proppant-loaded containers; (3) stacking the plurality of proppant-loaded containers at the desired location so as to form a stack of the proppant-loaded containers; (4) lifting an upper most proppant-loaded container from the stack; (5) moving the upper most proppant-loaded container to a tilting mechanism; and (6) tilting the proppant-loaded container by the tilting mechanism so as to discharge the proppant from the container.

The discharged container can be transported to another stack of empty containers or to a position adjacent to the proppant-containing vessel. The proppant is discharged to a flow gate of the tilted proppant-loaded container into a hopper. The proppant from the hopper can be conveyed into a pneumatic bulk loader. The transported conveyed proppant in the pneumatic bulk trailer can then be transported to the well site.

DETAILED DESCRIPTION

Figure 1:
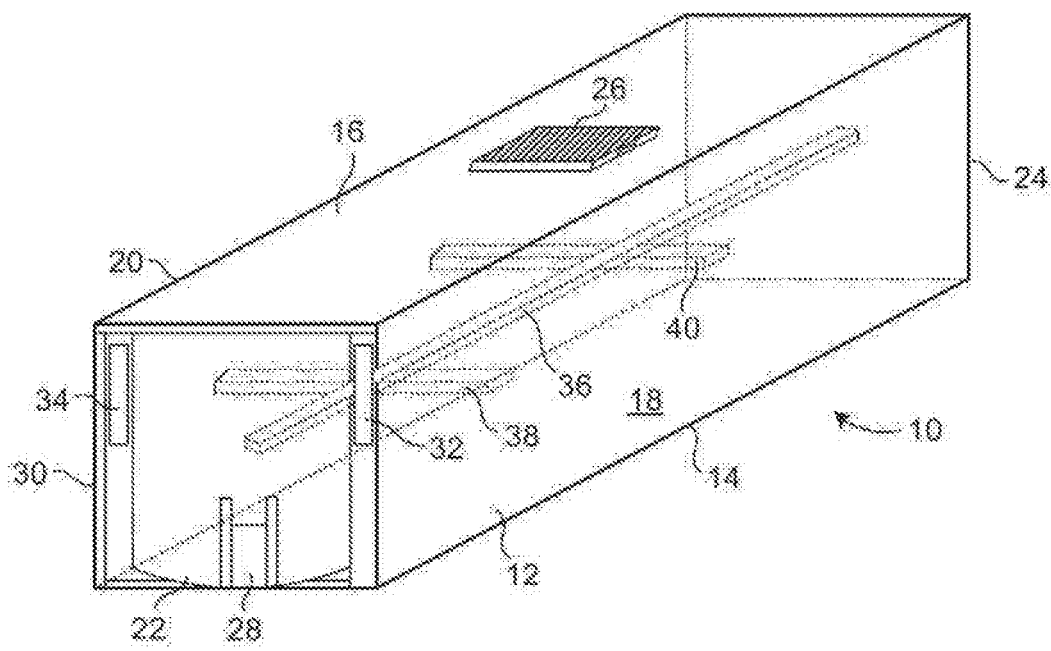
FIG. 1 is a prospective view of the container apparatus as used in the system of the present invention.

Referring to FIG. 1, there is shown the proppant storage apparatus 10 in accordance with the preferred embodiment of the present invention. The proppant storage apparatus 10 includes a container 12 having a bottom wall 14, a top wall 16, a pair of side walls 18 and 20 and a pair of end walls 22 and 24. The side wall 18 extends between the bottom wall 14 and the top wall 16. The side wall 20 also extends between the bottom wall 14 and the top wall 16 in generally spaced parallel relationship to the side wall 18. The end wall 22 extends between the bottom wall 14 and the top wall 16. Similarly, the end wall 24 extends between the bottom wall 14 and the top wall 16 and also between the side walls 18 and 20. The top wall 16 has a hatch 26 formed thereon. Hatch 26 is openable so as to allow proppant to be introduced into the interior volume of the container 12. A flow gate 28 is positioned on the end wall 22. The flow gate 28 is openable so as to allow the proppant to flow outwardly of the interior volume of the container 12.

It can be seen that the end wall 22 is recessed inwardly of an end of the pair of side walls 18 and 20 and inwardly of the bottom wall 14 and the top wall 16. As such, the outermost end 30 of the container 12 will provide a protective structure for the generally convex surface of the end wall 22. This convex shape of the end wall 22 facilitates the ability to funnel the proppant from within the interior volume of container 12 outwardly through the flow gate 28. The frame structure at the end 30 enhances the structural integrity of the container 12 at this end while protecting the mechanical structures associated with the flow gate 28. The flow gate 28 is slidable upwardly so as to open to the interior volume. An inlet 32 is generally positioned at the end wall 22 and opened through the end wall 22 to the interior volume of the container 12. This proppant inlet is suitable for allowing proppant and/or air to be introduced into the interior volume of the container. As such, when the container 12 is at a well site or other location, additional proppant can be introduced into the interior volume of the container 12 through the proppant inlet 32. Inlet 32 also allows air to be introduced into the interior volume of the container 12 so as facilitate the ability of the proppant within the container 12 to exit through the flow gate 28. The inlet 32 is in the nature of a tube that can be connected to a suitable hose. A vent 34 is also positioned at the end wall 22. Vent 34 opens to the interior volume of the container 12 so as to allow excess air pressure to exit outwardly of the container 18.

The container 10 is configured so as to contain 96,000 pounds of proppant therein. Since each railcar can transport 192,000 pounds of proppant, a pair of containers 12 can receive all of the proppant from the railcar. However, conventional shipping containers could lack the structural integrity to contain such a large weight. As such, the proppant storage apparatus 10 includes an interior structure which enhances the integrity of the container 12 for its intended purpose.

In particular, a longitudinal member 36 is positioned in the interior volume of the container 12. Longitudinal member 36 extends generally centrally of the interior volume of the container 12. The longitudinal member 36 has one end rigidly affixed to the end wall 22 and an opposite end rigidly affixed to the end wall 24. This connection will maintain the integrity of the end walls 22 and 24 in spite of the large weight of proppant urging thereagainst. A first cross member 38 is positioned within the interior volume of the container 12. The first cross member 38 has one end affixed to the side wall 18 and an opposite end affixed to the side wall 20. A second cross member 40 is also positioned in the interior volume of the container and is in generally spaced parallel relationship to the first cross member 38. Each of the cross members 38 and 40 is positioned generally centrally with respect to the height of the container 12. The second cross member has one end affixed to the side wall 18 and an opposite end affixed to the side wall 22. The cross member 38 and 40 are configured so as to maintain the integrity of the side walls 18 and 20 against the large weight of proppant contained within the interior volume of the container 12.

Figure 2:
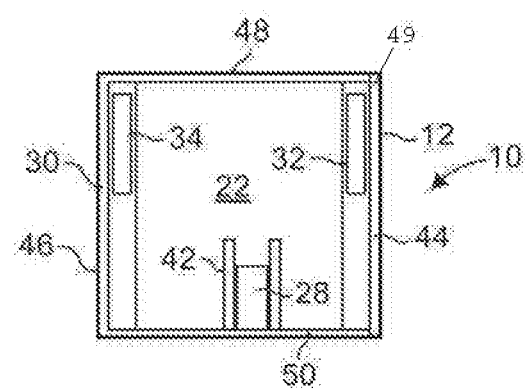
FIG. 2 is an end view of the container apparatus as used in the system of the present invention.

FIG. 2 is an end view showing the proppant storage apparatus 10 of the present invention. In particular, the end wall 22 of the container 12 is illustrated as having a hatch 28 slidably received within guides 42 thereon. Suitable hydraulic or pneumatic mechanisms can be associated with the flow gate 28 so as to raise or lower the flow gate 28. In the lowered position, the flow gate 28 locks the flow of proppant from the interior volume of the container 12. In the raised position, the flow gate 28 will open to the interior volume of the container 12 so as to allow proppant to be discharged therefrom. The proppant inlet 32 and the vent 34 are illustrated as positioned on the end wall 22.

Within the concept of the present invention, it is advantageous to be able to stack several containers on top of one another. As such, the end surface 30 has structural uprights 44 and 46 thereon. Similarly, horizontal structural members 48 and 50 will extend between the structural uprights 44 and 46 at the top and bottom of the container 12. The structural members enhance the integrity of the container so that a large amount of weight can be stacked upon the container 12. Again, the structural members 44, 46, 48 and 50 enhance the integrity of the container 12 to the heavy weight supported therein.

Figure 3:
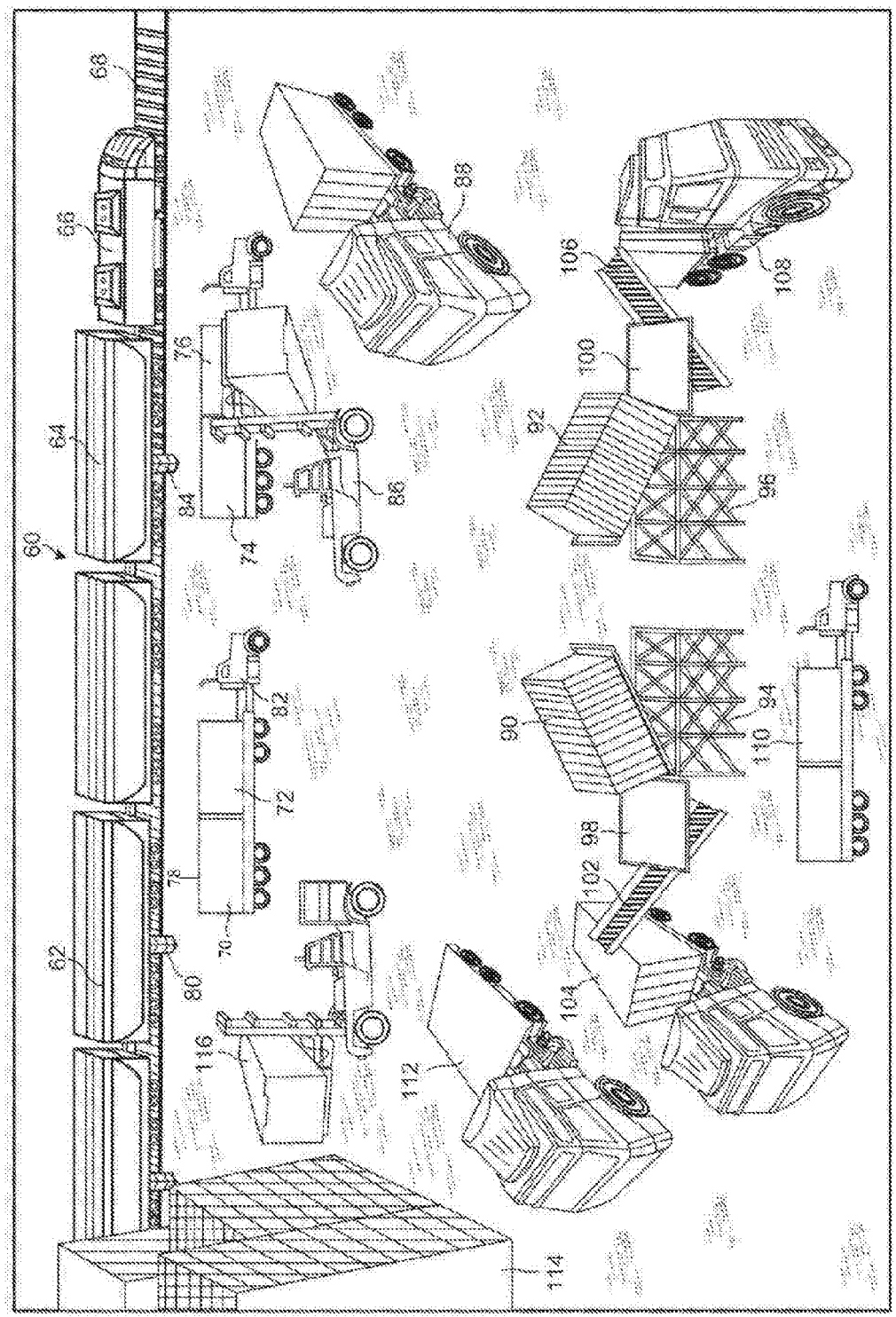
FIG. 3 is an illustration of the system of the present invention.

FIG. 3 shows a system 60 of the present invention. The system 60 initially involves the transport of a load of proppant to a desired location in a vessel 62. The vessel 62 is in the nature of hoppers associated with a bulk material train 64. The bulk material train 64 is driven by an engine 66 located on a rail spur 68. As such, in the present invention, the bulk material is delivered by the bulk material train 64 to the desired location. The vessel 62 of the bulk material train 64 can be immediately unloaded at this desired location so that the engine 66 can return the bulk material train 64 for other railroad usages.

The rail spur 68 is illustrated as being located in an elevated location. As such, containers 70, 72, 74 and 76 can be located in proximity to the vessel 62 and adjacent to the bulk material train 64. Each of the containers 70, 72, 74 and 76 has a configuration similar to that shown herein in association with FIGS. 1 and 2.

The hatch on the top wall 78 of the container 70 is illustrated as being adjacent to a conveyer 80 associated with the vessel 62. In other words, the hopper of the bulk material train 64 is opened adjacent to the conveyer 80. The conveyer 80 extends between the gate of the vessel 62 and the hatch at the top wall 78 of the container 70. Once this hopper of the bulk material train 64 is unloaded into the vessel 70, the conveyer 80 can be moved forwardly along the bulk material train 64 so that another hopper can discharge its proppant content into the container 72 of truck 82. The containers 70 and 72 are supported on the bed of the truck 82. Similarly, a conveyer 84 allows the unloading of another hopper of the bulk material train 64 into the container 74. The container 76 can be maintained in proximity to another hopper of the bulk material train 64 so that further unloading can occur.

A container loader/unloader 86 is positioned so as to allow for the lifting and transport of the containers 70, 72, 74 and 76. In particular, in FIG. 3, in can be seen that the container loader/unloader 86 has removed the containers from the truck 88 and has placed containers 92 and 92 upon tilting mechanisms 94 and 96, respectively. The tilting mechanisms 94 and 96 include a support panel that is pivotally connected to a frame. A hydraulic mechanism can then pivot the plate upwardly so that the container 90 is tilted so that the end wall faces at an angle downwardly toward a hopper 98. The tilting mechanism 96 also includes a similar structure such that the end wall of the container 92 is directed downwardly toward the hopper 100. The tilting mechanisms 94 and 96 allow proppant to be discharged in a very fast, convenient and safe manner into the respective hoppers 98 and 100.

A conveyer 102 extends to the bottom of the hopper 98 and to the top of a pneumatic bulk trailer 104. As a result, the proppant that is discharged through the flow gate at the end wall of the container 92 into the hopper 98 is transported by the conveyer 102 into the pneumatic bulk trailer 104. Similarly, another conveyer 106 extends from the hopper 100 to another pneumatic bulk trailer 108 so as to discharge proppant into the pneumatic bulk trailer. When each of the pneumatic bulk trailers 108 has been filled with proppant, these pneumatic bulk trailers 104 and 108 can then transport the proppant to the well site.

Flatbed trucks 110 and 112 are in line for receiving additional containers 114. Truck 112 is positioned adjacent to the container 114 so that the container loader/unloader 116 can place the containers onto the flatbed of the truck 112. Truck 112 can then move to another position adjacent to the bulk material train 64 for the further unloading of the hoppers associated therewith. As such, it can be seen that the staging of the various flatbed trucks allows for the efficient and effective removal of the proppant from the hoppers of the bulk material train 64.

In FIG. 3, the containers 114 are arranged in a stacked configuration. The containers 114, as illustrated in FIG. 3, are stacked in a five-high stack since the containers are empty. However, within the concept of the present invention, if it is possible to unload the bulk material train 64 faster than the bulk material trailers 104 and 108 are available, then the filled containers can also be arranged in a stack. Typically, the containers can only be stacked four-high in view of large weight supported therein. These containers can be stacked until such time as proppant is required or until such time as equipment is available for the unloading of such containers.

Each of containers as utilized in the system of the present invention is a specially designed 8 foot by 20 foot container that is capable of containing 96,000 pounds of proppant. The containers can be moved by flatbed, low bed and container chassis that are accessible and economical. The facilities, such as illustrated in FIG. 3, requires only 1.5 acres to manage 45 million pounds of proppant. Empty containers can be stacked five-high and full containers can be stacked three or four high. Lashing can be used to ensure safety. The containers associated with the present invention allow proppant to be removed in an efficient and effective manner. Air can be injected through the inlet so as to facilitate the flow of proppant outwardly at the flow gate. In this arrangement, it has been found that 90,000 pounds of proppant can be unloaded in fifteen minutes.

Each of the containers can be arranged as to store 360,000 pounds of proppant per 160 square feet of footprint. The unloading equipment can unload one railcar in less than twenty minutes or unload a 120 car unit train in less than 48 hours. Multiple railcars can be unloaded at the same time.

The arrangement of containers is scalable for as much or as little proppant as required. A WMS inventory control system can be utilized. In such a system, each container can be bar-coded (using bar codes or logging mechanisms 49) and logged-in to track the amount of proppant on hand by the mesh size of the proppant. Once the containers are loaded, they can be easily and safely stacked up in yards. As such, air space is utilized as opposed to yard space. All that is required is a solid foundation and proper container handling equipment.

The proppant is unloaded from containers to pneumatic bulk trailers. As such, the proppant will stay dry and would be manipulated less then flat-stored proppant. When the proppant is ordered, the container-moving machines move the container to hydraulic chassis. Proppant is then dumped into the hoppers. An airbox is utilized so as to blow the proppant out of the container.

The process of the present invention ensures close proximity of the site to the rail spur. The process of the present invention can be rapidly implemented when compared to silo facilities. Typically, such silo facilities can take up to two years to build. The number of containers is scalable for inventory requirements. A mini-stack of containers can be moved and recharged at the drill site so as to ensure continuous inventory for the fracturing operation. The system of the present invention can move the inventory closer to the production field then the prior art.

The present invention provides a lower overall cost per ton of proppant. In particular, the empty containers can be staged on-site at the mine. This serves to smooth out productivity for the proppant supplier. It also serves to improve throughput/profits for the proppant supplier. Any over supplies or leftover production can be stored on-site. This allows the company to negotiate better rates in exchange for helping the proppant supplier with their supply chain problems.

In contrast to prior systems where the pneumatic bulk trailer continually moves back and forth from the bulk material train to the well site, the present invention allows for the storage of such proppant in a location adjacent to the rail line. As a result, the truck drivers can have reduced fatigue. A safer work environment is promoted by the system of the present invention. A higher quality driver pool is maintained. Additionally, this system complies with Department of Transportation regulations.

This application claims the benefit of, and is a continuation of U.S. patent application Ser. No. 14/851,005, filed Sep. 11, 2015, titled "Methods of Storing and Moving Proppant at Location Adjacent Rail Line," which is a continuation of U.S. patent application Ser. No. 14/314,468, filed Jun. 25, 2014, titled "Methods of Storing and Moving Proppant at Location Adjacent Rail Line," now U.S. Pat. No. 9,162,603, issued Oct. 20, 2015, which is a continuation of U.S. patent application Ser. No. 14/310,648, filed Jun. 20, 2014, titled "Method of Delivering, Transporting, and Storing Proppant for Delivery and Use at a Well Site," now U.S. Pat. No. 9,248,772, issued Feb. 2, 2016, which is a continuation of PCT Application No. PCT/US13/32819, filed on Mar. 18, 2013, titled "System of Delivering and Storing Proppant for Use at a Well Site and Container for Such Proppant," which claims the benefit of U.S. patent application Ser. No. 13/427,140, filed on Mar. 22, 2012, titled "System of Delivering and Storing Proppant for Use at a Well Site and Container for Such Proppant," now U.S. Pat. No. 8,622,251, issued on Jan. 7, 2014, which is a continuation-in-part of U.S. patent application Ser. No. 13/332,937 filed on Dec. 21, 2011, titled "Proppant Storage Vessel and Assembly Thereof," now U.S. Pat. No. 8,827,118, issued on Sep. 9, 2014, all of which are incorporated herein by reference in their entireties.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

That claimed is:

1. A method of storing and moving fracking proppant at a desired location, the method comprising:
 a) stacking a plurality of containers separate from a vehicle on top of one another so that a bottom of one of the plurality of containers overlies the top of another one of the plurality of containers to thereby define a stack, the stack positioned at a desired location, the structural integrity of the plurality of containers being enhanced by a plurality of structural uprights positioned to extend from the bottom to the top of each of the plurality of containers and thereby increase the weight carrying capacity of each of the plurality of containers when fracking proppant is positioned therein;

b) placing one or more of the plurality of containers from the stack onto one or more trailers of one or more vehicles by use of a container loader/unloader;

c) moving the plurality of containers when positioned on the one or more trailers away from the stack of the plurality of containers; and d) scaling the number of the plurality of containers according to the amount of proppant required at a particular location, each of the plurality of containers positioned to include an outlet adjacent the bottom for discharge of proppant therefrom, an opening adjacent the top thereof to load proppant therein, a pair of spaced-apart end walls connected to and extending between the bottom and the top, and a pair of side walls connected to and extending between the pair of end walls and the top and the bottom, each of the plurality of containers further includes one or more structural support members extending and positioned at intervals between the pair of end walls and the pair of side walls of each container.

2. The method of claim 1, further comprising:
before step a), transporting proppant to the desired location, the desired location being on a rail line, on one or more railcars, each railcar configured to transport an amount of proppant equal to or greater than the amount of proppant required to fill at least two of the plurality of containers.

3. The method of claim 1, wherein the moving includes positioning each of the plurality of containers when proppant is contained therein adjacent a fracturing operation of a production field.

4. The method of claim 1, further comprising a flow gate positioned adjacent the outlet to control flow of proppant through the outlet.

5. The method of claim 4, further comprising:
tracking the amount of proppant on hand at the location with bar-codes or logging mechanisms, and injecting air into each of the plurality of containers to enhance flow of proppant from the outlet of each of the plurality of containers adjacent the flow gate.

6. The method of claim 4, further comprising:
tracking the mesh size of the proppant in the containers at the location with bar-codes or logging mechanisms.

7. The method of claim 1, wherein the plurality of containers each has proppant therein and includes up to four containers, wherein the up to four containers are positioned in the stack, wherein the stack comprises a first stack, wherein the method further comprises stacking another plurality of containers that each have proppant therein closely adjacent the first stack thereby to define a second stack, and wherein the one or more structural support members include a plurality of cross members.

8. The method of claim 5, further comprising staging a plurality of empty containers at a proppant site.

9. The method of claim 1, wherein the outlet of each of the plurality of containers is positioned in a substantially central portion of the bottom of the container, wherein the one or more structural support members of each of the plurality of containers further includes a plurality of horizontal structural members extending between the plurality of structural uprights.

10. The method of claim 1, further comprising:
positioning prongs of a forklift in one or more slots positioned adjacent the bottom of each of the plurality of containers in a defined region thereby to enhance lifting and positioning of the containers for stacking and moving.

11. A method of storing and moving fracking proppant at a desired location, the method comprising:

a) removing proppant for fracking from a railcar;

b) storing the proppant in a plurality of containers separate from the railcar, each container of the plurality of containers comprising:
an opening adjacent the top thereof to receive proppant into the container, a pair of spaced-apart end walls connected to and extending between the bottom and the top, and a pair of sidewalls connected to an extending between the pair of end walls and the top and the bottom, and one or more structural support members extending between the pair of end walls and one or more structural support members extending between the side walls;
an outlet adjacent a bottom for discharge of proppant therefrom;
a flow gate positioned adjacent the outlet to control flow of proppant through the outlet; and c) transporting one or more of the plurality of containers with one or more vehicle trailers;

d) removing the one or more of the plurality of containers from the one or more vehicle trailers; and e) scaling the number of containers at the desired location according to the amount of proppant required at a particular location, each of the plurality of containers has a plurality of structural uprights positioned to extend from the bottom to the top of each of the plurality of containers at intervals between the side walls and the end walls to thereby increase the weight carrying capacity of each of the plurality of containers.

12. The method of claim 11, wherein step b) further comprises:
stacking the plurality of containers on top of one another so that a bottom of one of the plurality of containers overlies the top of another one of the plurality of containers to thereby define a stack to reduce the footprint of the stored containers.

13. The method of claim 12, wherein the plurality of containers that each has proppant therein includes two or more containers, wherein the two or more containers are positioned in the stack, wherein the stack comprises a first stack, and wherein the method further comprises stacking another plurality of containers that each have proppant therein closely adjacent the first stack thereby to define a second stack.

14. The method of claim 11, further comprising:
before step a), transporting proppant to the location adjacent a rail line on one or more railcars, each railcar configured to transport an amount of proppant equal to or greater than the amount of proppant required to fill at least two of the plurality of containers.

15. The method of claim 11, wherein the transporting includes positioning each of the plurality of containers that has proppant contained therein adjacent a fracturing operation of a production field.

16. The method of claim 11, further comprising:
tracking the amount of proppant on hand at a location with bar-codes or logging mechanisms.

17. The method of claim 16, further comprising:
tracking the mesh size of the proppant in the containers at the location with bar-codes or logging mechanisms.

18. The method of claim 11, further comprising staging a plurality of empty containers at a proppant site.

19. The method of claim 11, wherein the outlet of each of the plurality of containers is positioned in a substantially central portion of the bottom of the container, and wherein the method further includes injecting air into each of the plurality of containers to enhance flow of proppant from the outlet of each of the plurality of containers adjacent the flow gate when discharging proppant therefrom.

20. The method of claim 11, further comprising:
    positioning prongs of a forklift in one or more slots positioned adjacent the bottom of each of the plurality of containers in a defined region to thereby enhance lifting and positioning of the containers for stacking and moving the plurality of containers.

* * * * *